US008805576B1

(12) United States Patent
Clupper et al.

(10) Patent No.: US 8,805,576 B1
(45) Date of Patent: Aug. 12, 2014

(54) OPPORTUNISTIC MAIL DOCUMENT COMMINGLING

(71) Applicant: DST Output West, LLC, El Dorado Hills, CA (US)

(72) Inventors: Charles B. Clupper, El Dorado Hills, CA (US); Marc Fagan, Folsom, CA (US); Raymond H. Thill, III, Antelope, CA (US); William T. Kohrummel, Auburn, CA (US); John Arndt, El Dorado Hills, CA (US); Frank W. Delfer, Granite Bay, CA (US); Mury Lee Albert Salls, El Dorado Hills, CA (US); Charles E. Preston, Orangevale, CA (US)

(73) Assignee: DST Output West, LLC, El Dorado Hills, CA (US)

( * ) Notice: Subject to any disclaimer, the term of this patent is extended or adjusted under 35 U.S.C. 154(b) by 0 days.

(21) Appl. No.: 13/964,716

(22) Filed: Aug. 12, 2013

Related U.S. Application Data

(63) Continuation of application No. 12/763,814, filed on Apr. 20, 2010, now Pat. No. 8,682,479.

(60) Provisional application No. 61/214,104, filed on Apr. 20, 2009.

(51) Int. Cl.
*G06F 7/00* (2006.01)

(52) U.S. Cl.
USPC .......... 700/224; 700/226; 700/223; 700/225; 700/227

(58) Field of Classification Search
None
See application file for complete search history.

(56) References Cited

U.S. PATENT DOCUMENTS

| 5,072,401 | A | * | 12/1991 | Sansone et al. | 700/219 |
|---|---|---|---|---|---|
| 5,264,665 | A | * | 11/1993 | Delfer, III | 177/25.15 |
| 6,674,038 | B1 | * | 1/2004 | Latta | 209/584 |
| 2006/0080122 | A1 | | 4/2006 | Klopsch et al. | |
| 2008/0027986 | A1 | * | 1/2008 | Stemmle | 707/104.1 |
| 2008/0082205 | A1 | | 4/2008 | Park et al. | |
| 2009/0159508 | A1 | | 6/2009 | Kostyniuk et al. | |
| 2009/0319324 | A1 | * | 12/2009 | Lee et al. | 705/8 |
| 2013/0124255 | A1 | * | 5/2013 | Patterson et al. | 705/7.27 |

* cited by examiner

*Primary Examiner* — Yolanda Cumbess
(74) *Attorney, Agent, or Firm* — James M. Ritchey

(57) ABSTRACT

A system and method of operation for proactively grouping disparate mail items that are queued to be produced in a processing facility, wherein the system and method utilize a manufacturing completion schedule for virtually grouping the mail items before physical production occurs and the system and method maximizes profitability by discounting the mail items by applying appropriate discount mailing regulations for virtually grouping the mail items before physical production occurs.

6 Claims, 1 Drawing Sheet

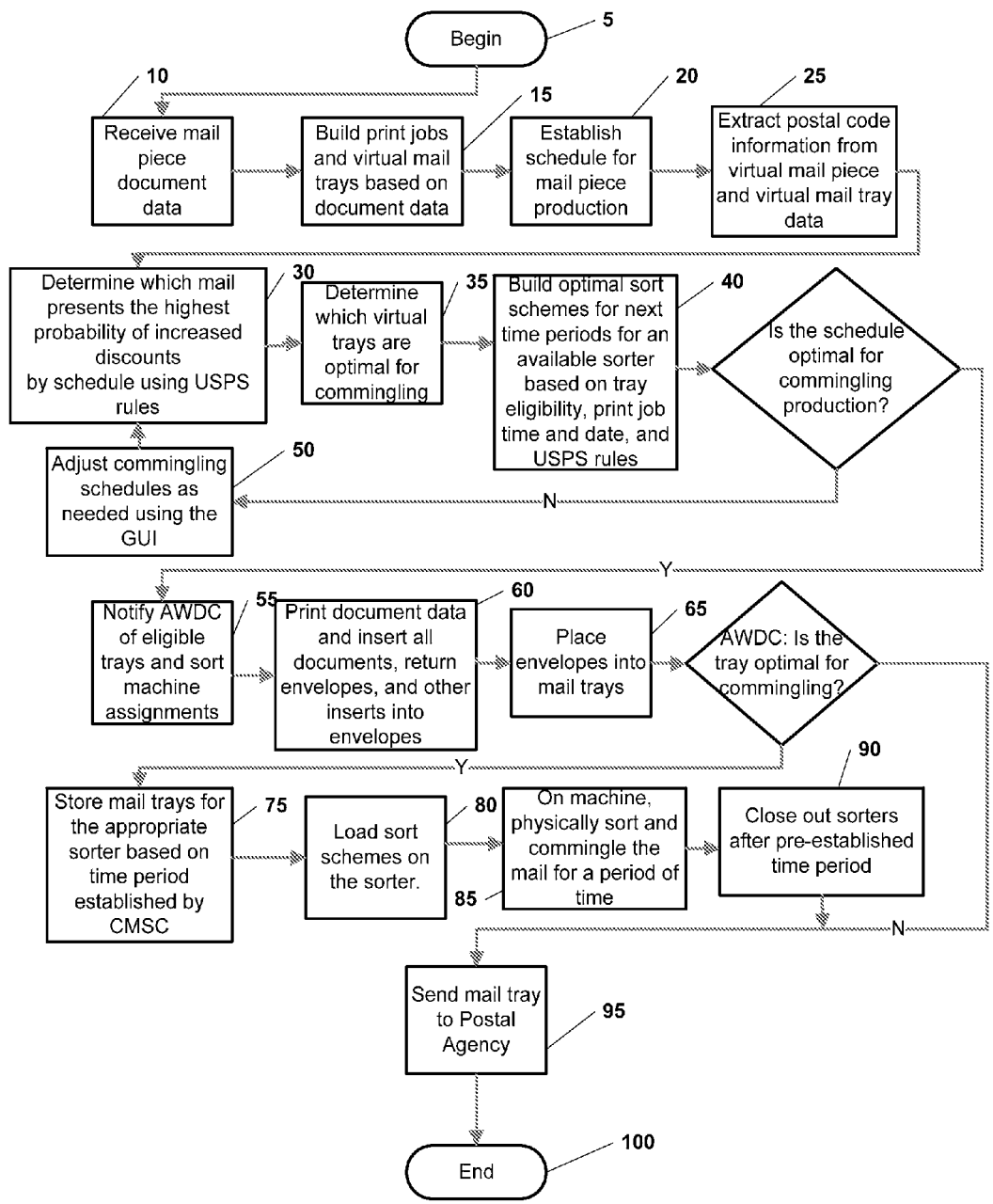

OPPORTUNISTIC MAIL DOCUMENT COMMINGLING

CROSS-REFERENCE TO RELATED APPLICATIONS

This application is a continuation of U.S. patent application Ser. No. 12/763,814 filed on Apr. 20, 2010, incorporated herein by reference in its entirety, which is a nonprovisional of U.S. provisional application Ser. No. 61/214,104 filed on Apr. 20, 2009, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The subject invention pertains generally to a system and method of commingling selected documents into mail-pieces or mail items that are initially assigned to "virtual" mailing trays to maximize the various US Postal Service mailing rate discounts and to minimize physical sortation handling of the actual mail-pieces during assembly of the final physical mailing trays. More particularly, the subject system and method of operation relates to proactively grouping disparate mail items by considering a manufacture completion schedule and maximum profitability of discounting the mail items by examining the mail that is queued to be produced in a processing (print and/or mail) facility. Even more particularly, the subject system and method allow a bulk mailer to group all of the documents coming from one or more sources and being mailed to one zip code into a single mail tray piece that is first created in a "virtual" mailing tray before it is physically sorted into an actual physical mailing tray, thereby maximizing US Postal Service discount mailing rates for similar ZIP Code items and minimizing wasted time and funds required for multiple physical sortation loops.

2. Description of Related Art

US Postal Service (USPS) regulations require that in order to obtain the maximum mail rate discount, mail/mailpieces must be grouped together by ZIP Code or ZIP Code range. These rules are described at length in the USPS Domestic Mail Manual (DMM). There are several ways of grouping mail to obtain the discounts (see discount details below). One common way is to take mail that has been manufactured to a commingling or presort machine. A typical example of a presort machine is a "Bowe Bell and Howell Criterion Mail Sorter."

U.S. Patent Application 20060080122 discloses that multiple print streams destined for individual print stream processing modules are optimized prior to printing. The process of optimizing includes receiving an input representing a plurality of documents to be printed and determining an attribute of each document of the plurality of documents represented by the input. The attribute relates to processing of the respective document through the document processing system. Optimization involves balancing an operation time of a first print stream processing module with an operation time of a second print stream processing module, by assigning each document to one of the print stream processing modules based on its determined attribute. It is stress that the invention described is a document processing process that optimizes the order of multiple print streams of documents comprising documents that are destined for use with a "Bowe Bell and Howell Criterion Mail Sorter"-type machine.

Another way to process mail/mailpieces is to commingle the mail, prior to actual print production, into print files that are already grouped in the correct sort order based on the rules in the DMM. Examples of this approach are described in U.S. Pat. No. 5,264,665 and commercially available software products that accomplish this same grouping through software such as Postalsoft Mailing Software from Firstlogic/Business Objects (http://www.businessobjects.com/products/postalsoft/) and Infoprint Workflow from IBM/Ricoh. Additionally, software currently exists that uses mail data from mail in the process of being manufactured to update sort schemes on presort equipment. WinSort Smart Scheme from Bowe Bell and Howell is an example of this type of software (http://www.bowebellhowell.com/WinSortSmart-Scheme.aspx).

Specifically, according to US Postal Service mailing regulations, individual mail-pieces that are sorted by various ZIP Code schemes may receive lower postage rates. Commercial prices are affected by the level of sorting accomplished based on volume minimums, e.g. 150 pieces under current regulations. In order to benefit from ZIP Code grouping discounts, traditional bulk mailing facilities employ multiple physical sortation passes on the sortation equipment to achieve the various ZIP Code discounts. Each final level of sortation is charged a different mailing rate by the US Postal Service. The sortation schemes place letters into appropriate mailing trays. Presort software has existed for several years that can help with the sorting process, but its implementation still requires multiple physical sortation passes of the mail-pieces to assemble the various discounted mailing trays. Often the existing sortation software sorts and prints address labels by ZIP Code according to the standards of a particular mailing service, as well as creating tray and sack labels, sorting documentation, and completed postage statements. Additionally, it is stressed that requirements exist concerning the actual number of mail-pieces contained in a mailing tray(s) to meet the minimum quantity for discount rates.

Mail-pieces that are sorted to five digits share the same ZIP Code and are usually concentrated in one small town or neighborhood and receive the greatest postal discount. If there are not enough mail-pieces to qualify for the same 5-digit ZIP Code (5+4-digit Zip Codes are even more specific and, thus, possibly open to even greater discounts than 5-digit ZIP Codes), then the next level of postal discount (less discount than for the 5-digit ZIP Codes sortation) is for three digit ZIP Code sortation. Thus, after sorting all possible 5-digit ZIP codes, the mail-pieces that share the same first 3-digit ZIP Codes are grouped together. If there are not enough mail-pieces to qualify for the same 3-digit ZIP Code, then the next level of postal discount is for mail-pieces to be sorted to Automated Area Distribution Centers (AADCs), which are areas that serve several 3-digit ZIP Codes in one area of the country. Each AADC facility utilizes multi-line optical character readers, barcode sorters, and other equipment designed for processing automatically compatible mail-pieces. Finally, if there are not enough mail-pieces to qualify for the same AADC presort area then mixed AADC sortation is utilized. Mixed AADC sorted mailing trays include mail that will be going to several different final locations (these mailing trays require the greatest level of processing by the Postal Service and, therefore, receive less of a mailing rate discount).

Existing bulk mailers have attempted to obtain maximum postal rate discounts by attempting to follow the discount groupings presented immediately above (5-digit/5+4-digit ZIP Code (highest discount) to 3-digit ZIP Code to AADC to mixed AADC (lowest discount)). However, in order to achieve the 5-digit ZIP Code (highest) to mixed AADC (lowest) discounts, existing bulk mailers are faced with the necessity of sorting the mail-pieces via multiple physical sortation schemes. Each time the mail-pieces are physically handled to refine the final sortation arrangement time and money are lost. Thus, existing bulk mailers are faced with the hard financial fact that at some "trade-off" point the physical mail-piece sortation processes become too expensive and are not off-set by the associated mail-piece discounts. For example, one physical sortation pass of the mail-pieces extract some specific 5-digit ZIP Code items and most of the 3-digit ZIP Code items; all other 5-digit, 3-digit, AADC, and mixed AADC items require subsequent passes.

BRIEF SUMMARY OF THE INVENTION

By way of example, and not of limitation, described herein is a system and method of operation for proactively grouping disparate mail items that are queued to be produced in a processing facility, wherein the system and method utilize a manufacturing completion schedule for virtually grouping the mail items before physical production occurs and the system and method maximizes profitability by discounting the mail items by applying appropriate discount mailing regulations for virtually grouping the mail items before physical production occurs.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a flow diagram of the subject invention showing the various steps involved in initially creating "virtual" mailing trays and then actual physical mailing trays.

DETAILED DESCRIPTION OF THE INVENTION

Generally, the subject invention is a system and method for determining what mail-pieces in the bulk mailer facility/factory will go to a physical mail-piece commingling (aka "presort") operation. The subject system and method of operation proactively group disparate mail items by considering a manufacture completion schedule and maximum profitability of discounting the mail items by examining the mail that is queued to be produced in a processing (print and/or mail) facility. The subject invention optimizes the flow of mail-pieces into physical commingling machines (aka "presort machines") by predicting dynamically (virtually grouping and assembling) what mail-pieces can be sorted to a better ZIP Code grouping level, thereby reducing the need for multiple sorts on physical commingling machines. Multiple physical sorts waste time and expend funds, thereby cancelling out potentially beneficial ZIP Code grouping discount rates.

By utilizing existing continuous manifest mailing practices to achieve automated mail discounts with the US Postal Service (USPS) for 3-digit and 5-digit mail-pieces, the subject system also looks at mail in the factory prior to and during manufacture/assembly. The total mail within the mailing facility can be combined (from multiple customers to a single user address list) to increase mail discounts for 3-digit ZIP Codes, AADC, and mixed AADC mail-pieces that can be "uplifted" or upgraded to a better ZIP Code qualification for greater mail rate discounts per mail-piece (with a 5-digit or 5+4-digit Zip Code having a maximum discount per mailing tray).

In addition to optimizing the flow of mail into the commingling area, mail that been released to manufacture and is destined to be sent to commingling will be sort optimized utilizing predictive algorithms to increase ZIP Code density and profitability through generating optimal sort schemes. Mail that is in the manufacturing process will be selectively sent to commingling throughout the time a sort scheme is active in order to further enhance profitability and/or ZIP Code density. Clearly, during the subject process, trays of mail or individual pieces of mail are routed to one of several processing points in the factory, including, but not limited to: the commingling machines, the USPS, or a holding area for further processing.

The invention is comprised of several computer controller processes with linked functionality, which when run together, achieve the inventions broad and innovative target objectives. Although other equivalent systems and processes are considered to be within the realm of this disclosure, currently the operational processes are handled by a Commingling Machine Scheduler Controller (CMSC) and an Accumulation Workcell Director Controller (AWDC).

Specifically, the subject CMSC comprises several computer-associated components that gather information as to the current state of the factory and, from that information, makes a virtual forecast as to when physical mail pieces with targeted ZIP codes are likely to arrive in the physical commingling area. This controller uses the new commingling data files generated by a manufacturing execution system (MES) when a job is released. The contents of the file describe each container of mail, if containerized, the mail contents, and its targeted completion time and date. Also, this controller monitors current activity within the factory, including what mail is currently stored in a commingling mail accumulation area or those mail pieces that have already been completed. Additionally this information can include knowledge of what jobs are currently assigned to physical printers and physical inserters in the factory. The working premise is that, using this information, virtual sort schemes for the commingling machines can be automatically generated by subject software with a relatively high degree of accuracy (current models suggest 90%+ of the 5-digit ZIP Code opportunity can be captured in a continuous flow operation using a data horizon of all commingling eligible mail pieces that become visible once a job is released to print.) At regular time intervals, the controller determines bin (the location of individual mail pieces before loading into its appropriate mailing tray) sortation assignment plans for the next period of time utilizing mail ZIP Code data gathered during the current period of time. The controller then determines the sort bin assignments for the next period of time.

The subject AWDC is responsible for all activities within the mail accumulation area, that is, mail waiting for physical commingling. Mail that is routed to the commingling area must be positively acknowledged as received within the commingling area. At the decision point for the acceptance of mail into commingling, there is a "commingling received" transaction is sent to CMSC. The response to this transaction indicates whether or not the container was expected to go to commingling. A method of re-routing the container is provided in the event the container was mistakenly sent to the accumulation area. If the container is positively acknowledged, the subject system stores the date and time the container arrived in the accumulation area and makes this new data element visible to the operations staff through a suitable user interface.

Using the plan provided by the CMSC and container ZIP Code distribution information from the commingling data files, the AWDC routes incoming containers to either a holding area or directly to a sorter configured specifically for this mail in this container. This information is also used in moving containers from the holding area to a sorter.

With more specificity and in reference to FIG. 1, the subject system and method is now described. The subject system and method begin 5 by a mailing facility receiving numerous mail piece document data 10 from one or more customers. The customers of the mailing facility are of various types, such as cable companies, telephone companies, utility companies, advertising companies, financial institutions, or any other service and/or products/goods supplying organization that requires their data be processed and mailed to their individual consumers. The document data may be of any nature from financial documents, to advertisements, to billing statements, to equivalent data, but for exemplary means only, and not by way of limitation, the following description will be for a collection of billing statement documents that have been supplied by various providers of goods and/or services. The billing statement documents come from one to many customers who provide the various services and/or products/goods to their individual consumers. The document data may be transmitted to the mailing facility by any acceptable electronic and/or physical means such as transmission over suitable data lines, satellite transmission, internet transmission, physical tapes or mass storage devices, and equivalent means.

The "virtual mailing trays" begin assembly at step 15 in which the initial "best-case" virtual trays are created in which the subject commingling process is not yet included. Thus, the subject system builds the print jobs and virtual mail trays based on the received document data that is first "pre-processed" to normalize the incoming data (the data comes from various sources, each of which may have their own formatting standards, which needs to be normalized for compatibility in the subject process) and extract address information for each consumer. It is stressed that each consumer may have information coming into the mailing facility from multiple customers (say Joe Smith, the consumer, has billing statements from three different customers: a car loan institution, an electric utility provider, and a cell phone corporation) and each created mailing document (with each one containing one to many transaction records of varied types (billing statements, financial statements, and the like) that is mailed from the mailing facility must always have only one mailing address associated with the correct consumer.

At step 20 a mailing schedule is established for each mail piece production job. Each mail piece has a "due out date" attached to it that is determined by when it must leave the mailing facility to meet various Postal Service deadlines and to meet the time requirements set by each customer. Further, all of the postal code information is extracted from the virtual mail piece and virtual mailing tray data at step 25. This information is utilized in the following subject commingling process.

It is pointed out that, essentially, steps 15, 20, and 25 involve much of the Postal Processing System procedure already disclosed in U.S. Pat. No. 5,264,665 to Frank W. Delfer, a co-inventor of the subject invention. In practice, for an average mailing job, perhaps 30% of the mailing trays are suitably formed in this initial non-commingling virtual mailing tray process (described in U.S. Patent '665), however, the subject commingling process dramatically improves on this initial process for the actual final mailing trays.

The actual subject commingling process is initiated at step 30 and intimately involves the CMSC (described above and its relationship with the AWDC). The subject process determines which mail presents the highest probability of increased discounts by the schedule. Current U.S. Postal Service rules are utilized to maximize discounts by "uplifting" eligible mailing pieces from a lower discount category to a higher discount category (AADC to mixed AADC to 3-digit ZIP Code to 5-digit and 5+4-digit ZIP Codes). One of the key strategies utilized in this process is that ALL of the various documents from ALL of the customers are scanned to find which ones can be mailed within the same mailing piece during the window of time necessary to meet the "due out date." Additionally, current U.S. Postal Service rules are consulted concerning the actual number of mailing pieces that must be within each mailing tray to receive a discount.

Step 35 determines which virtual mailing trays are optimal for commingling. Basically, step 35 involves a decision as to whether or not the required physical handling costs are too high and, thus, destroy any discount that the commingling process created. This is a critical and very real decision point in which there is a practical playoff between the expenses of physically carrying out the commingling process (time, machine costs, operator costs, and the like) and the calculated cost benefits from the U.S. Postal Service rules for producing the various discounted mailing trays. If the created virtual trays do not present a discount benefit the commingling process is not utilized. In simplistic terms, by utilizing the virtual tray commingling qualifying process the mailing facility is able to determine if actually "touching" the mail to commingle is profitable.

Next, the actual machines employed to physically process the subject commingled trays are readied, including adjusting the operational cut-off times for when the USPS stops acceptance of mail for a particular ZIP Code. Thus, step 40 builds the optimal sort schemes for the next time periods for an available sorter based on tray eligibility, print job time and date, and USPS rules.

Step 45 asks the question: Is the commingling schedule optimal for production? This decision is determined by the "production reviewers" who look at the entire scheme to see if the various machines needed in the process are available for this process at this time or is some time-shifting required to fit in with the various other operations taking place in the entire mailing facility. If the answer is "no," then the process goes to step 30 where the commingling schedules are adjusted by the production staff as needed using a suitable GUI (Graphical User Interface) and the process loops back to step 30. Thus, the production staff utilizes the GUI to adjust the actual operational times for all of the machines involved in the subject commingling process. The print schedules follow the adjusted commingling schedules.

If the answer at step 45 is "yes," then the subject process proceeds to step 55 in which the AWDC is notified of the eligible trays and the sort machine assignments.

Step 60 relies heavily on the previous U.S. Pat. No. 5,264,665 techniques to print the necessary document data and insert all of the required items into a mailing envelope, thereby producing a mailing piece that is going to one consumer address (e.g. various billing statements, billing summaries, return envelope(s), inserts, and the like). At step 65 the produced envelopes are place physically into mailing trays.

At this point of the subject process, step 70, the AWDC asks the question: Is the tray optimal for commingling? If the answer is "no," then the process directly proceeds to step 95 and the mailing tray is sent to the USPS and the process terminates. However, if the answer is "yes" to the question posed in step 70, then step 75 stores the generated mailing trays for the appropriate sorter, based on the time period established by the CMSC.

The sort schemes are loaded onto the appropriate sorter at step 80. On the selected sorter at step 85 the physical sortation occurs that commingles the mail for a pre-established time period.

Step 90 closes out the sorters after a pre-established time period. Because of the virtual mailing tray sortation scheme of the subject invention, the subject system and method permits the implementing mailing facility to have multiple sort schemes per day. All other mailing facilities that current exist are unable to perform multiple sortations in a single day (unlike the subject invention, some "pre-sort shops" accomplish only secondary sorts that are not based on up-front data). By employing the virtual tray assembly scheme the implementing mailing facility requires only one physical pass to separate the mail pieces into heavily discounted mailing tray, unlike all other mailing facilities that require "two or more, usually more than two" physical passes to achieve the same final mailing tray discounts.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

From the discussion above it will be appreciated that the invention can be embodied in various ways, including the following:

1. A system for proactively grouping disparate mail items that are queued to be produced in a processing facility, wherein the system comprises: (a) means for utilizing a manufacturing completion schedule for grouping the mail items before physical production occurs; and (b) means for maximizing profitability by discounting the mail items by applying appropriate discount mailing regulations for grouping the mail items before physical production occurs.

2. A system according to embodiment 1, wherein the system optimizes the mail items before they are sent to mail sortation equipment in the mail facility by virtually running a preliminary sort, thereby creating virtual groupings of the mail items before physically grouping the mail items by use of said mail sortation equipment.

3. A system according to embodiment 1, wherein the mail items are placed into virtual mailing trays in a first process and physical mailing trays in a second process that follows said first process.

4. A system for proactively grouping disparate mail items that are queued to be produced in a processing facility, wherein the system comprises: (a) means for collecting mail item relevant information relating to a manufacture completion schedule and maximum profitability of mail item discounts; (b) means for assembling virtual mailing trays from said collect mail item relevant information; and (c) means for assembling one-pass physical mailing trays based on said virtual assembly.

5. A system for proactively grouping disparate mail items that are queued to be produced in a processing facility, wherein the system comprises: (a) means for assembling virtual mailing trays, wherein said virtual assembly means comprises: (i) means for receiving mail item document data; (ii) means for building print jobs and virtual mailing trays based on said document data; (iii) means for establishing a schedule for mail item production; (iv) means for extracting postal code information from the mail items within said virtual mailing trays; (v) means for determining which mail items present the highest probability of increased discounts by schedule using USPS rules; (vi) means for determining which virtual trays are optimal for commingling; (vii) means for building optimal sort schedules for next time periods for an available sorter based on tray eligibility, print job time and date, and USPS rules; (viii) means for establishing that each said sort schedule is optimal for commingling production, adjusting each non-optimal sort schedule as needed using GUI and re-determining said discount probability, and passing on each optimal sort schedule; (ix) means for notifying an associated controller of eligible trays and sort machine assignments; and (b) means for assembling one-pass physical mailing trays from said virtual mailing trays, wherein said one-pass physical mailing tray assembly means comprises: (i) means for printing document data and inserting all documents, return envelopes, and other inserts into envelopes; (ii) means for placing envelopes into mailing trays; (iii) means for determining if each said mailing tray is optimal for commingling and directly mailing each said tray that is not optimal; (iv) means for storing each said mailing tray that is optimal for a selected sorter based on a established time period for sorting; (v) means for loading sort schemes on said selected sorter; (vi) means for physically sorting and commingling on said selected sorter the mail pieces for a pre-established period of time; (vii) means for closing out said selected sorter after said pre-established time period; and (viii) means for mailing each sorted and commingled mail tray.

6. A method for proactively grouping disparate mail items that are queued to be produced in a processing facility, wherein the method comprises the steps: (a) utilizing a manufacturing completion schedule for grouping the mail items before physical production occurs; and (b) maximizing profitability by discounting the mail items by applying appropriate discount mailing regulations for grouping the mail items before physical production occurs.

7. A method according to embodiment 6, wherein the method optimizes the mail items before they are sent to mail sortation equipment in the mail facility by virtually running a preliminary sort, thereby creating virtual groupings of the mail items before physically grouping the mail items by use of said mail sortation equipment.

8. A method according to embodiment 6, wherein the mail items are placed into virtual mailing trays in a first process and physical mailing trays in a second process that follows said first process.

9. A method for proactively grouping disparate mail items that are queued to be produced in a processing facility, wherein the method comprises the steps: (a) collecting mail item relevant information relating to a manufacture completion schedule and maximum profitability of mail item discounts; (b) assembling virtual mailing trays from said collect mail item relevant information; and (c) assembling one-pass physical mailing trays based on said virtual assembly.

10. A method for proactively grouping disparate mail items that are queued to be produced in a processing facility, wherein the method comprises the steps: (a) assembling virtual mailing trays utilizing the steps: (i) receiving mail item document data; (ii) building print jobs and virtual mailing trays based on said document data; (iii) establishing a schedule for mail item production; (iv) extracting postal code information from the mail items within said virtual mailing trays; (v) determining which mail items present the highest probability of increased discounts by schedule using USPS rules; (vi) determining which virtual trays are optimal for commingling; (vii) building optimal sort schedules for next time periods for an available sorter based on tray eligibility, print job time and date, and USPS rules; (viii) establishing that each said sort schedule is optimal for commingling production, adjusting each non-optimal sort schedule as needed using GUI and re-determining said discount probability, and passing on each optimal sort schedule; (ix) notifying an associated controller of eligible trays and sort machine assignments; and (b) assembling one-pass physical mailing trays from said virtual mailing trays employing the steps: (i) printing document data and inserting all documents, return envelopes, and other inserts into envelopes; (ii) placing envelopes into mailing trays; (iii) determining if each said mailing tray is optimal for commingling and directly mailing each said tray that is not optimal; (iv) storing each said mailing tray that is optimal for a selected sorter based on an established time period for sorting; (v) loading sort schemes on said selected sorter; (vi) physically sorting and commingling on said selected sorter the mail pieces for a pre-established period of time; (vii) closing out said selected sorter after said pre-established time period; and (viii) mailing each sorted and commingled mail tray.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for proactively grouping disparate mail items that are queued to be produced in a processing facility into virtual mailing trays containing virtual groupings of mail items, wherein the system comprises:
   (a) means for utilizing a manufacturing completion schedule for grouping the mail items before physical production occurs, wherein said means builds optimal sort schemes for the next time periods for an available sorter based on tray eligibility and print job time and date and
   (b) means for maximizing profitability by discounting the mail items by applying appropriate discount mailing regulations for grouping the mail items before physical production occurs.

2. A system according to claim 1, wherein the system optimizes the mail items before they are sent to mail sortation equipment in the mail facility by virtually running a preliminary sort, thereby creating virtual groupings of the mail items before physically grouping the mail items by use of said mail sortation equipment.

3. A system according to claim 1, wherein the mail items are placed into virtual mailing trays in a first process and physical mailing trays in a second process that follows said first process.

4. A method for proactively grouping disparate mail items that are queued to be produced in a processing facility into virtual mailing trays containing virtual groupings of mail items, wherein the method comprises the steps:
(a) utilizing a manufacturing completion schedule for grouping the mail items before physical production occurs, wherein said utilization includes building optimal sort schemes for the next time periods for an available sorter based on tray eligibility and print job time and date; and
(b) maximizing profitability by discounting the mail items by applying appropriate discount mailing regulations for grouping the mail items before physical production occurs.

5. A method according to claim 4, wherein the method optimizes the mail items before they are sent to mail sortation equipment in the mail facility by virtually running a preliminary sort, thereby creating virtual groupings of the mail items before physically grouping the mail items by use of said mail sortation equipment.

6. A method according to claim 4, wherein the mail items are placed into virtual mailing trays in a first process and physical mailing trays in a second process that follows said first process.

\* \* \* \* \*